US012327432B2

(12) United States Patent
Madrigal et al.

(10) Patent No.: US 12,327,432 B2
(45) Date of Patent: Jun. 10, 2025

(54) PATTERN RECOGNITION FOR FACE-AUTHENTICATION ANTI-SPOOFING

(71) Applicant: Google LLC, Mountain View, CA (US)

(72) Inventors: Octavio Ponce Madrigal, Mountain View, CA (US); Patrick M. Amihood, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 65 days.

(21) Appl. No.: 17/905,760

(22) PCT Filed: May 19, 2021

(86) PCT No.: PCT/US2021/033182
§ 371 (c)(1),
(2) Date: Sep. 6, 2022

(87) PCT Pub. No.: WO2022/245349
PCT Pub. Date: Nov. 24, 2022

(65) Prior Publication Data
US 2024/0221429 A1 Jul. 4, 2024

(51) Int. Cl.
*G06V 40/40* (2022.01)
*G06F 21/32* (2013.01)
*G06V 40/16* (2022.01)

(52) U.S. Cl.
CPC .............. *G06V 40/40* (2022.01); *G06F 21/32* (2013.01); *G06V 40/16* (2022.01)

(58) Field of Classification Search
CPC ......... G06V 40/40; G06V 40/16; G06F 21/32
See application file for complete search history.

(56) References Cited

U.S. PATENT DOCUMENTS

| 3,522,764 A | 8/1970 | Biber et al. |
| 5,729,604 A | 3/1998 | Van Schyndel |

(Continued)

FOREIGN PATENT DOCUMENTS

| CN | 101196663 | 12/2012 |
| WO | 2019238251 | 12/2019 |

OTHER PUBLICATIONS

"International Preliminary Report on Patentability", Application No. PCT/US2021/033182, Nov. 21, 2023, 8 pages.

(Continued)

*Primary Examiner* — Kent Yip
(74) *Attorney, Agent, or Firm* — Colby Nipper PLLC

(57) ABSTRACT

Techniques and apparatuses are described that implement pattern recognition for face-authentication anti-spoofing. In particular, a face-authentication system distinguishes between a real human face and a presentation attack that uses a display to present a virtual human face. Operational settings of a camera system of the face-authentication system are tailored to enable detection of a pattern associated with an operation of the display. A spoofing detector of the face-authentication system analyzes one or more images captured by the camera system and determines whether or not the pattern is present within the image(s). If the pattern is present, the face-authentication system does not provide face authentication. Alternatively, if the pattern is not present, the face-authentication system can provide face authentication if facial recognition is successful. In this way, the face-authentication system can prevent unauthorized actors from using the presentation attack to gain access to a user's account or information.

20 Claims, 8 Drawing Sheets

(56) References Cited

U.S. PATENT DOCUMENTS

| | | | |
|---|---|---|---|
| 6,104,808 | A | 8/2000 | Alameh et al. |
| 6,542,436 | B1 | 4/2003 | Myllyla |
| 7,801,315 | B2 | 9/2010 | Watanabe et al. |
| 9,665,784 | B2 | 5/2017 | Derakhshani et al. |
| 10,990,808 | B2 * | 4/2021 | Hua .................... A61B 5/1176 |
| 11,687,778 | B2 * | 6/2023 | Ciftci .................... G06V 40/40 |
| | | | 382/115 |
| 2016/0044753 | A1 | 2/2016 | Lee |
| 2018/0307815 | A1 | 10/2018 | Samadani et al. |
| 2020/0175256 | A1 | 6/2020 | Benini et al. |

OTHER PUBLICATIONS

"Foreign Office Action", TW Application No. 111109756, Feb. 16, 2023, 13 pages.

"International Search Report and Written Opinion", Application No. PCT/US2021/033182, Feb. 10, 2022, 10 pages.

Lai, et al., "A Smart Spoofing Face Detector by Display Features Analysis", Jul. 2016, 15 pages.

Ming, et al., "A Survey On Anti-Spoofing Methods For Face Recognition with RGB Cameras of Generic Consumer Devices", Oct. 8, 2020, 53 pages.

Patel, et al., "Secure Face Unlock: Spook Detection on Smartphones", Oct. 2016, pp. 2268-2283.

Pinto, et al., "Video-Based Face Spoofing Detection through Visual Rhythm Analysis", Aug. 2012, 8 pages.

\* cited by examiner

700

```
┌─────────────────────────────────────────────┐
│ Set a capture rate of a camera system of a  │
│ face-authentication system to be greater    │
│ than a threshold for detecting a pattern    │
│ associated with an operation of a display   │
│                    702                      │
└─────────────────────────────────────────────┘
                      │
                      ▼
┌─────────────────────────────────────────────┐
│ Capture at least one image of an object     │
│ using the capture rate                      │
│                    704                      │
└─────────────────────────────────────────────┘
                      │
                      ▼
┌─────────────────────────────────────────────┐
│ Recognize the pattern within the at least   │
│ one image                                   │
│                    706                      │
└─────────────────────────────────────────────┘
                      │
                      ▼
┌─────────────────────────────────────────────┐
│ Responsive to recognizing the pattern,      │
│ determine that the object includes the      │
│ display                                     │
│                    708                      │
└─────────────────────────────────────────────┘
                      │
                      ▼
┌─────────────────────────────────────────────┐
│ Responsive to determining that the object   │
│ includes the display, prevent face          │
│ authentication                              │
│                    710                      │
└─────────────────────────────────────────────┘
```

*FIG. 7*

PATTERN RECOGNITION FOR FACE-AUTHENTICATION ANTI-SPOOFING

RELATED APPLICATION(S)

This application is a national stage entry of International Application No. PCT/US2021/033182, filed May 19, 2021, the disclosure of which is incorporated herein by reference in its entirety.

BACKGROUND

Face authentication provides a convenient way for users to unlock their device, add security for accessing accounts, or sign transactions, which enhances the user experience. Some face-authentication systems rely on cameras for face authentication. However, it can be challenging for a camera to distinguish between a user's face and an image of the user's face. As such, challenges arise in preventing unauthorized actors from spoofing a face-authentication system that relies on cameras.

SUMMARY

Techniques and apparatuses are described that implement pattern recognition for face-authentication anti-spoofing. In particular, a face-authentication system distinguishes between a real human face and a presentation attack that uses a display to present a virtual human face (e.g., a digital picture of a human face). The face-authentication system includes a camera system and a spoofing detector. The camera system captures one or more images for face authentication. Operational settings of the camera system are tailored to enable the spoofing detector to detect a pattern associated with an operation of the display that is used in the presentation attack. The spoofing detector analyzes the images captured by the camera system and determines whether or not the pattern is present within the images. If the pattern is present, the face-authentication system does not provide face authentication. Alternatively, if the pattern is not present, the face-authentication system can provide face authentication if facial recognition is successful. In this way, the face-authentication system can prevent unauthorized actors from using the presentation attack to gain access to a user's account or information.

Aspects described below include a method of a face-authentication system, which performs pattern recognition for face-authentication anti-spoofing. The method includes setting a capture rate of a camera system of the face-authentication system to be greater than a threshold for detecting a pattern associated with an operation of a display. The method also includes capturing at least one image of an object using the capture rate. The method additionally includes recognizing the pattern within the at least one image. Responsive to recognizing the pattern, the method includes determining that the object includes the display. Responsive to determining that the object includes the display, the method further includes preventing face authentication.

Aspects described below also include an apparatus comprising the face-authentication system configured to perform any of the described methods.

Aspects described below include a computer-readable storage media comprising computer-executable instructions that, responsive to execution by a processor, cause the face-authentication system to perform any one of the described methods.

Aspects described below also include a system with means for performing pattern recognition for face-authentication anti-spoofing.

BRIEF DESCRIPTION OF DRAWINGS

Apparatuses for and techniques implementing pattern recognition for face-authentication anti-spoofing are described with reference to the following drawings. The same numbers are used throughout the drawings to reference like features and components:

FIG. 7 illustrates an example method for performing operations of pattern recognition for face authentication anti-spoofing.

DETAILED DESCRIPTION

Overview

Face authentication provides a convenient way for users to unlock their device, add security for accessing accounts, or sign transactions, which enhances the user experience. Some face-authentication systems rely on cameras for face authentication. However, it can be challenging for a camera to distinguish between a user's face and an image of the user's face. As such, challenges arise in preventing unauthorized actors from spoofing a face-authentication system that relies on cameras.

Some techniques distinguish between real face and an image of a face by detecting blinking or facial movements. These techniques, however, can require additional capture time, thereby increasing latency involved with performing face authentication. Furthermore, these techniques may be overcome using a video recording of a human face that includes these movements.

To address these problems, this document describes techniques and devices that implement pattern recognition for face-authentication anti-spoofing. In particular, a face-authentication system distinguishes between a real human face and a presentation attack that uses a display to present a virtual human face (e.g., a digital picture of a human face). The face-authentication system includes a camera system and a spoofing detector. The camera system captures one or more images for face authentication. Operational settings of the camera system are tailored to enable the spoofing detector to detect a pattern associated with an operation of the display that is used in the presentation attack. The spoofing detector analyzes the images captured by the camera system and determines whether or not the pattern is present within the images. If the pattern is present, the face-authentication system does not provide face authentication. Alternatively, if the pattern is not present, the face-authentication system can provide face authentication if facial recognition is successful. In this way, the face-authentication system can prevent unauthorized actors from using the presentation attack to gain access to a user's account or information.

Example Environment

Figure 1:
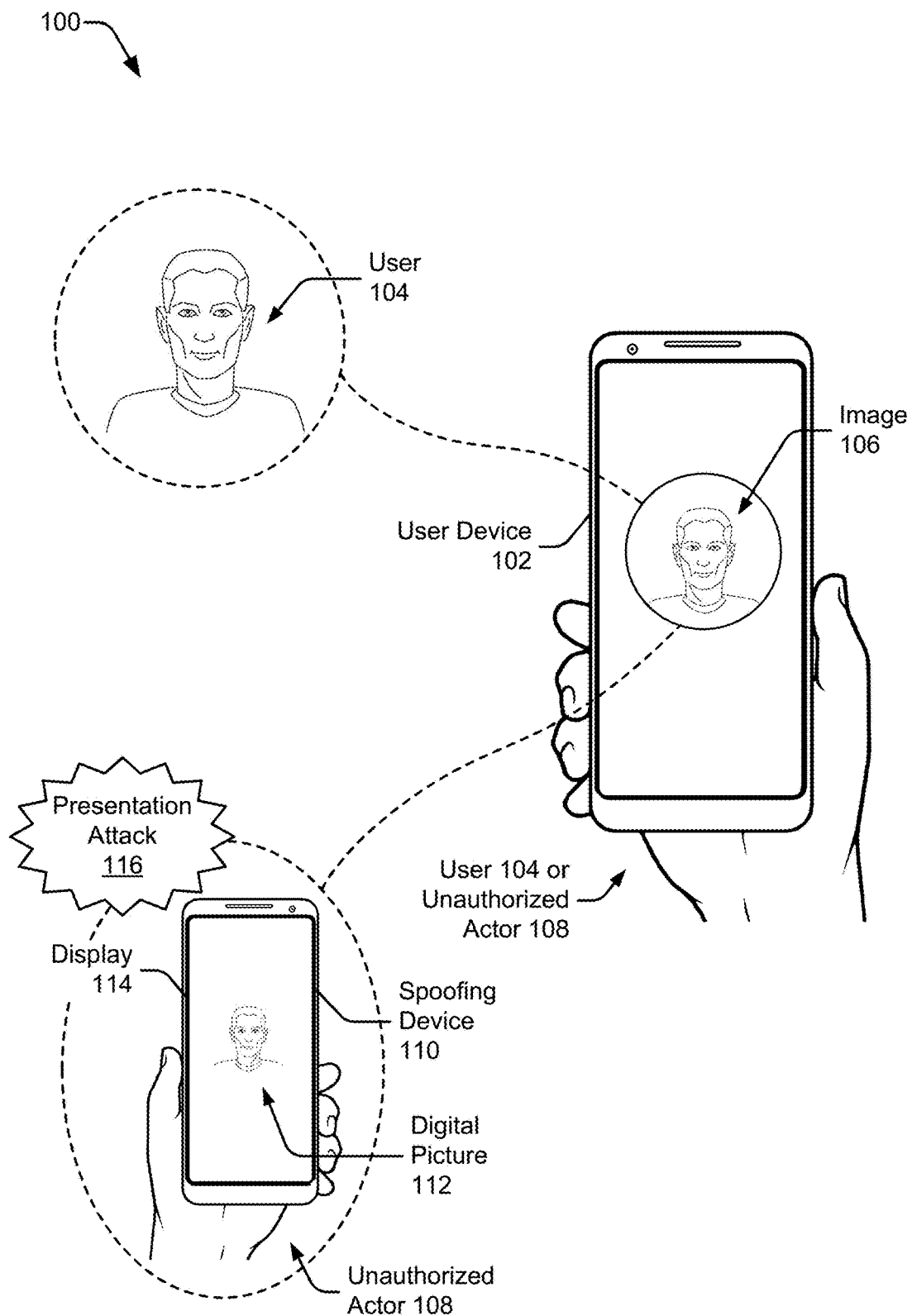
FIG. 1 illustrates an example environment in which pattern recognition for face-authentication anti-spoofing can be implemented.

FIG. 1 is an illustration of an example environment 100 in which techniques using pattern recognition for face authentication anti-spoofing may be embodied. In the environment 100, a user device 102 performs face authentication. In some situations, a user 104 controls the user device 102 and uses face authentication to access an application or to sign a transaction. During face authentication, the user device 102 captures one or more images 106. In this case, the image 106 includes the user 104's face. Using facial recognition techniques, the user device 102 recognizes and authenticates the user 104.

In other situations, an unauthorized actor 108 may have control of the user device 102. In this case, the unauthorized actor 108 uses a second device (e.g., a spoofing device 110) to attempt to spoof (e.g., trick) the user device 102 into granting the unauthorized actor 108 access to the user 104's account or information. The spoofing device 110 can be a smartphone, a tablet, a wearable device, a television, or a virtual or augmented reality headset. The spoofing device 110 includes a display 114. The display 114 can be a light-emitting diode (LED) display or a liquid-crystal display (LCD). Example LED displays include an organic LED (OLED) display, a polymer or plastic OLED (PLED or P-OLED) display, or a glass OLED (GLED or G-OLED) display. Example LCD displays may or may not use backlight scanning. On the display 114, the spoofing device 110 presents a digital picture 112 of the user 104.

During face authentication, the unauthorized actor 108 orients the display 114 of the spoofing device 110 towards a camera of the user device 102 to cause the user device 102 to capture images 106 of the digital picture 112 presented on the display 114. This action represents a type of presentation attack 116. This type of presentation attack 116 can spoof some authentication systems of the user device 102 and cause the user device 102 to grant the unauthorized actor 108 access. However, with the techniques of pattern recognition for face-authentication anti-spoofing, the user device 102 determines that the image 106 captures a portion of the display 114. With this knowledge, the user device 102 denies the unauthorized actor 108 authorization.

With the described techniques, the user device 102 can distinguish between a human face (e.g., a face of the user 104) and a virtual face (e.g., a digital picture 112) presented by a variety of different types of displays 114. In particular, the user device 102 recognizes patterns that are associated with an operation of the display 114. These operations can include pulse-width modulation, which some displays use to control brightness. Other operations can include black-frame insertion or backlight scanning, which some displays use to reduce motion blur. The user device 102 is further described with respect to FIG. 2.

Figure 2:
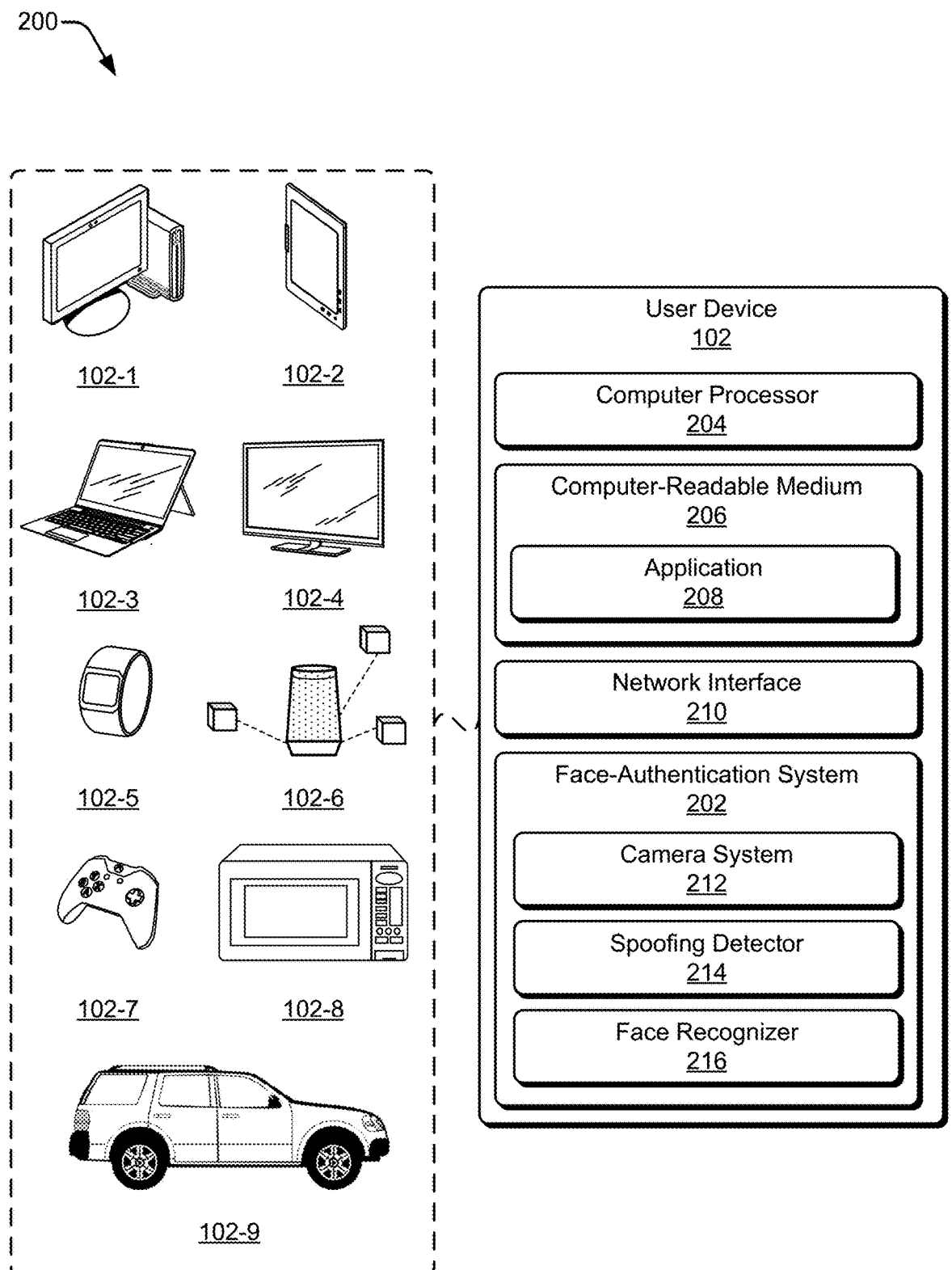
FIG. 2 illustrates an example implementation of a face-authentication system as part of a user device.

FIG. 2 illustrates a face-authentication system 202 as part of the user device 102. The user device 102 is illustrated with various non-limiting example devices including a desktop computer 102-1, a tablet 102-2, a laptop 102-3, a television 102-4, a computing watch 102-5, a home-automation and control system 102-6, a gaming system 102-7, a microwave 102-8, and a vehicle 102-9. Other devices may also be used, such as a home service device, a smart thermostat, a security camera, a baby monitor, a Wi-Fi™ router, a drone, a trackpad, a drawing pad, a netbook, an e-reader, a wall display, and another home appliance. Note that the user device 102 can be wearable, non-wearable but mobile, or relatively immobile (e.g., desktops and appliances). The face-authentication system 202 can be used as a stand-alone face-authentication system or used with, or embedded within, many different devices or peripherals, such as in control panels that control home appliances and systems, in automobiles, or as an attachment to a laptop computer.

The user device 102 includes one or more computer processors 204 and at least one computer-readable medium 206, which includes memory media and storage media. Applications and/or an operating system (not shown) embodied as computer-readable instructions on the computer-readable medium 206 can be executed by the computer processor 204 to provide some of the functionalities described herein. The computer-readable medium 206 also includes an application 208 or setting, which activates in response to the face-authentication system 202 authenticating the user 104. Example applications 208 can include a password-storage application, a banking application, a wallet application, a health application, or any application that provides user privacy.

The user device 102 can also include a network interface 210 for communicating data over wired, wireless, or optical networks. For example, the network interface 210 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The user device 102 may also include a display (not shown).

The face-authentication system 202 enables the user 104 to access the application 208, settings, or other resources of the user device 102 using an image of the user 104's face. The face-authentication system 202 includes at least one camera system 212, at least one spoofing detector 214, and at least one face recognizer 216. Various implementations of the face-authentication system 202 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof.

The face-authentication system 202 can be designed to operate under a variety of different environmental conditions. For example, the face-authentication system 202 can support face authentication for distances between approximately 20 and 70 centimeters. These distances represent distances between the user device 102 and the user 104. As another example, the face-authentication system 202 can support face authentication for a variety of tilt and pan angles of the user device 102 that provide angular views between approximately −40 and 40 degrees. Additionally, the face-authentication system 202 can be designed to make a decision regarding face authentication within a predetermined amount of time, such as 100 to 200 milliseconds (ms). This time frame can include a total amount of time it takes to capture the images 106, process the images to determine whether or not a presentation attack 116 occurred, and process the images to determine whether or not the images 106 represent the user 104's face.

The camera system 212 captures images 106 for face authentication. The camera system 212 includes at least one camera, such as a red-green blue (RGB) camera. The camera system 212 can also include one or more illuminators to provide lighting, especially in dark environments. The illuminator can include an RGB light, such as an LED. In some implementations, the camera system 212 can be used for other applications, such as for taking selfies, capturing pictures for the application 208, scanning documents, reading barcodes, and so forth.

The camera system 212 can have a variety of customizable settings, including a capture rate and exposure time. As an example, the camera system 212 can support captures rates of 30 hertz (Hz) or more (e.g., 60 Hz, 90 Hz, 120 Hz, or 240 Hz). The camera system 212 can also support exposure times of at least one millisecond (e.g., 1 ms, 10 ms, 100 ms, 0.1 seconds (see), 1 sec, 5 sec, or 10 sec). By controlling the operational settings of the camera system 212, the face-authentication system 202 can facilitate pattern recognition for face-authentication anti-spoofing.

The face-authentication system 202 can appropriately balance an amount of light captured for pattern recognition with the exposure time. In some implementations, the face-authentication system 202 can account for other features of the camera system 212 that can enable additional light to be captured. These features can include a lens size of the camera system 212, an available light source, and techniques that increase the capture rate and average frames together.

The spoofing detector 214 analyzes the images 106 captured using the camera system 212 and determine whether or not the images 106 depict a human face or a portion of a display 114 that presents a virtual human face as part of a presentation attack 116. In particular, the spoofing detector 214 identifies whether or not a pattern associated with an operation of the display 114 is present. Sometimes, the pattern can be identified based on a single image 106. Other times, the pattern can be identified based on changes across or between two or more images 106. To increase confidence, the spoofing detector 214 can analyze additional images (or sets of images) to confirm whether or not the pattern is present.

If the pattern is present, then the spoofing detector 214 determines that the user device 102 has been subjected to a presentation attack 116. If the pattern is not present, the spoofing detector 214 determines that the user device 102 is not subjected to a presentation attack 116. The face-authentication system 202 can grant authorization responsive to the spoofing detector 214 not detecting the presentation attack 116.

The face recognizer 216 performs face recognition to verify that a human face presented in the images 106 corresponds to an authorized user 104 of the user device 102. The spoofing detector 214 and the face recognizer 216 can be implemented in software, programmable hardware, or some combination thereof. In some implementations, the spoofing detector 214 and/or the face recognizer 216 are implemented using a machine-learned module (e.g., a neural network). An operation of the face-authentication system 202 is further described with respect to FIG. 3.

Pattern Recognition for Face-Authentication Anti-Spoofing

Figure 3:
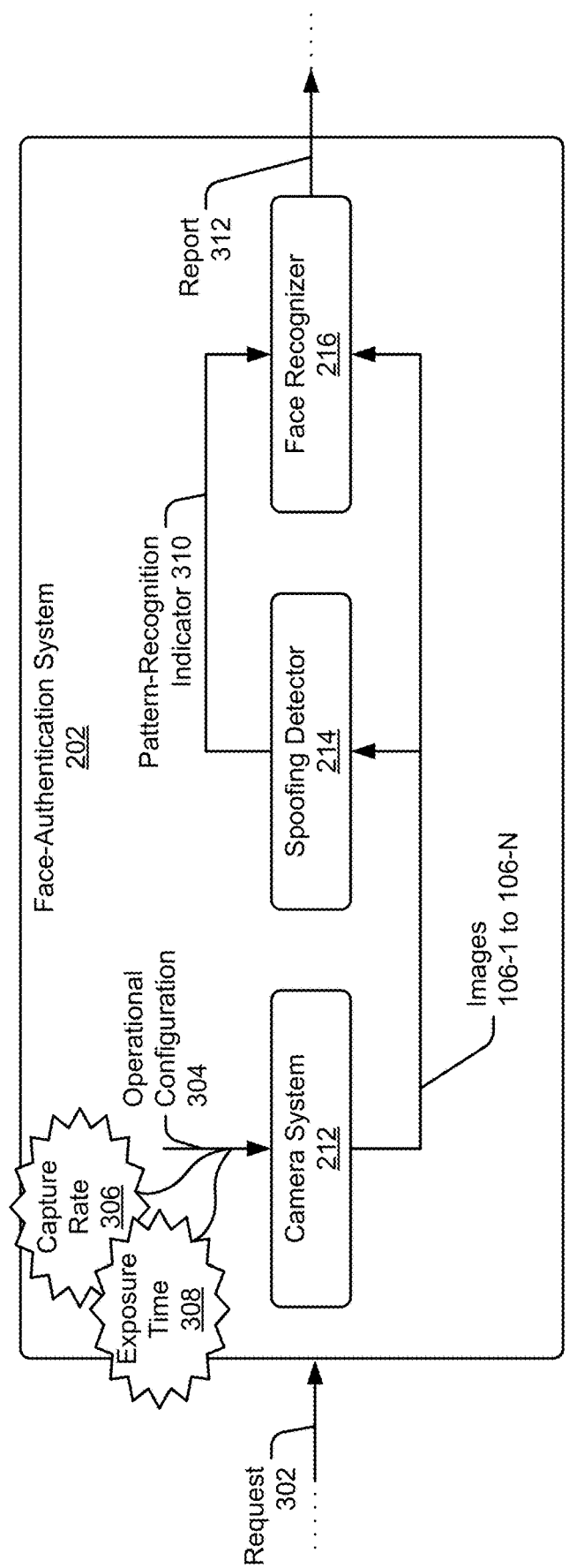
FIG. 3 illustrates an example face-authentication system that performs pattern recognition for face-authentication anti-spoofing.

FIG. 3 illustrates an example face-authentication system 202 that performs pattern recognition for face-authentication anti-spoofing. In the depicted configuration, the face-authentication system 202 includes the camera system 212, the spoofing detector 214, and the face recognizer 216. The spoofing detector 214 and the face recognizer 216 are coupled to the camera system 212. In some implementations, the spoofing detector 214 is coupled to the face recognizer 216.

During operation, the face-authentication system 202 accepts a request 302 to perform face authentication. In some situations, the request 302 is provided by the application 208 or another service that requires face authentication. In other situations, the request 302 is provided by a sensor of the user device 102 responsive to detecting an interaction with the user 104. For example, an inertial measurement unit (IMU) sensor sends the request 302 to the face-authentication system 202 responsive to detecting the user 104 lifting the user device 102.

In response to receiving the request 302, the face-authentication system 202 initializes and activates the camera system 212. In particular, the face-authentication system 202 sets an operational configuration 304 of the camera system 212, such as a capture rate 306 (e.g., frame rate) and/or an exposure time 308. The operational configuration 304 is tailored to enable the face-authentication system 202 to detect a pattern associated with a presentation attack 116 that uses a display 114. In some implementations, the operational configuration 304 is selected based on a likelihood of a presentation attack 116 using a particular type of display, such as an LED display on a smartphone. In other implementations, the face-authentication system 202 can cycle between different operational configurations 304 to improve a likelihood of the face-authentication system 202 detecting presentation attacks 116 performed by a variety of different types of displays. Sometimes, the face-authentication system 202 uses a first operational configuration 304 for a first time period to detect presentation attacks 116 and switches to a second operational configuration 304 for a second time period to capture images for face recognition. Example patterns and operational configurations 304 are further described with respect to FIGS. 4-6.

The camera system 212 captures images 106-1 to 106-N using the operational configuration 304 specified by the face-authentication system 202, where N is a positive integer. The spoofing detector 214 accepts at least a portion of the images 106-1 to 106-N. By analyzing the images 106-1 to 106-N, the spoofing detector 214 can detect a pattern associated with the presentation attack 116. The spoofing detector 214 generates a pattern-recognition indicator 310, which indicates whether or not the spoofing detector 214 recognizes the pattern within the images 106-1 to 106-N (e.g., indicates whether or not the spoofing detector 214 detects the presentation attack 116). In some implementations, the spoofing detector 214 provides the pattern-recognition indicator 310 to the face recognizer 216, as shown in FIG. 3. In other implementations, the spoofing detector 214 provides the pattern-recognition indicator 310 to the application 208 or service that provided the request 302. Additionally or alternatively, the spoofing detector 214 provides the pattern-recognition indicator 310 to other logic components of the face-authentication system 202 (not shown), which determine whether or not to provide authentication.

The face recognizer 216 accepts at least a portion of the images 106-1 to 106-N and the pattern-recognition indicator 310. If the pattern-recognition indicator 310 indicates that a presentation attack 116 is not detected, the face recognizer 216 performs face recognition to determine whether the user 104's face is present within the images 106-1 to 106-N. The face recognizer 216 generates a report 312, which is provided to the application 208 or the service that sent the request 302. If the face recognizer 216 recognizes the user 104's face and the pattern-recognition indicator 310 indicates absence of the presentation attack 116, the face recognizer 216 uses the report 312 to indicate successful face authentication. Alternatively, if the face recognizer 216 does not recognize the user 104's face or the pattern-recognition indicator 310 indicates occurrence of the presentation attack 116, the face recognizer 216 uses the report 312 to indicate that face authentication failed. The spoofing detector 214 can recognize a variety of different patterns associated with the presentation attack 116, as further described with respect to FIGS. 4-6.

Figure 4:
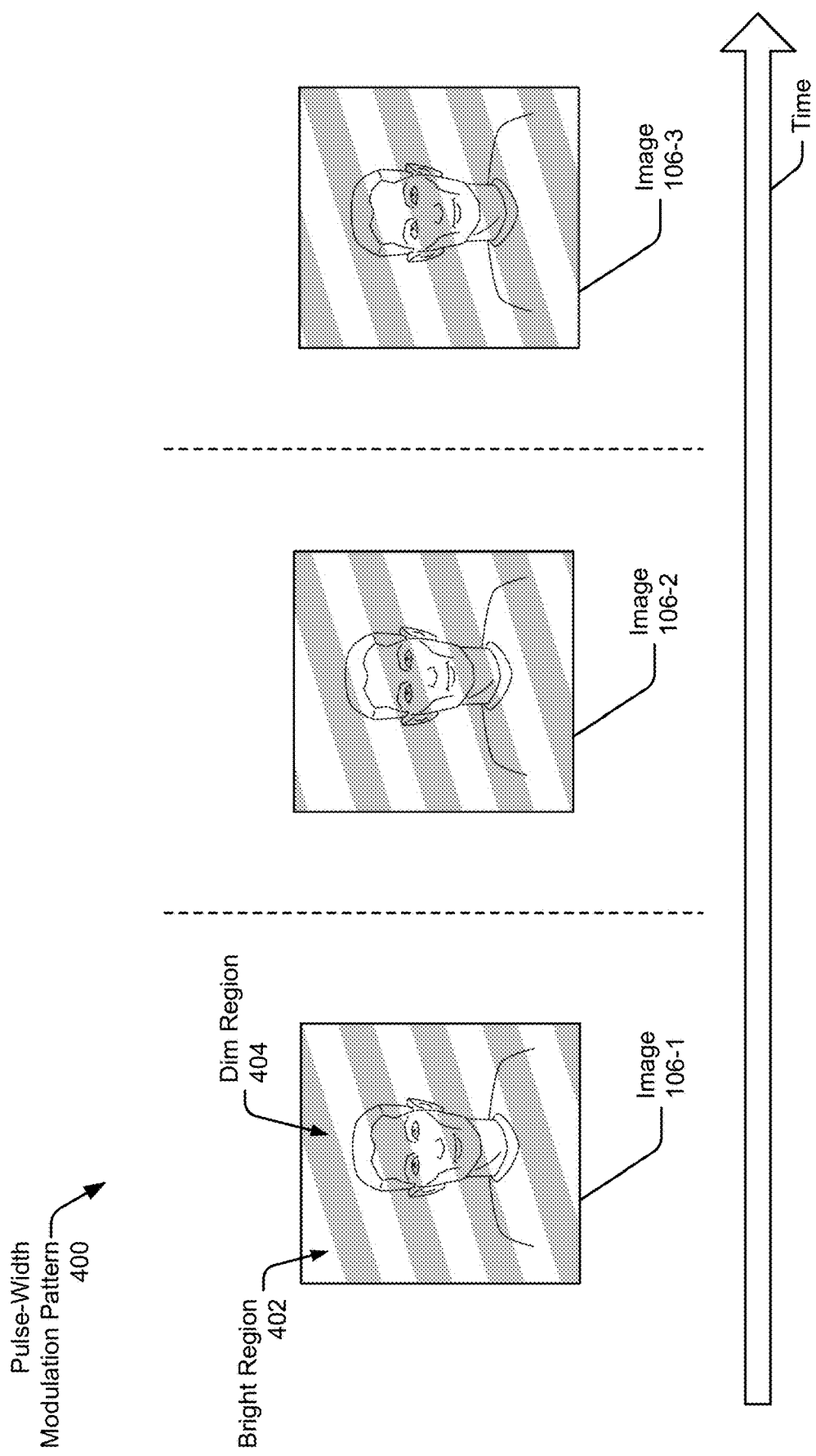
FIG. 4 illustrates an example pulse-width-modulation pattern.

FIG. 4 illustrates an example pulse-width modulation pattern 400, which the spoofing detector 214 can recognize. Some displays 114, including LED displays, use pulse-width modulation (PWM) to control a brightness level. In particular, the display 114 uses a pulse-width-modulation signal to control operational states of the LEDs within the display 114. In general, the pulse-width-modulation signal rapidly pulses the LEDs on and off to cause a human eye to observe the display 114 producing a steady dimmed light. The pulse-width-modulation signal can have two amplitude levels. A first amplitude level causes an LED to be in an on-state, which produces light. A second amplitude level causes the LED to be in an off-state, which does not produce light. In many cases, the pulse-width-modulation signal scans the display 114 from top to bottom, which creates dim regions across the display 114.

The pulse-width modulation signal has a duty cycle and a frequency, which determines a length of time each LED is producing light. Example frequencies of the pulse-width modulation signal can be approximately 240 Hz or 360 Hz. In some displays 114, a pulse-width modulation signal having a frequency of approximately 240 Hz can support refresh rates that are approximately equal to 10, 30, 60, or 120 Hz. Also, another pulse-width modulation signal having a frequency of approximately 360 Hz can support refresh rates that are approximately equal to 10 Hz, 30 Hz, 45 Hz, 60 Hz, 90 Hz, or 120 Hz. Example duty cycles can be between 0% and 100%, including 20%, 50%, and 80%. In general, decreasing the percentage of time that the LEDs are in the on-state (e.g., decreasing the duty cycle of the pulse-width-modulation signal) dims the display 114 and increasing the percentage of time that the LEDs are in the on-state (e.g., increasing the duty cycle) brightens the display 114.

Use of the pulse-width modulation signal creates the pulse-width modulation pattern 400, which is characterized by bright regions 402 interlaced with dim regions 404 (e.g., regions with less brightness compared to the bright regions 402). Widths of the dim regions 404 vary based on the duty cycle of the pulse-width modulation signal.

To detect the pulse-width modulation pattern 400, the face-authentication system 202 configures the camera system 212 to use a capture rate 306 that is greater than a first threshold for detecting the pulse-width modulation pattern 400. The first threshold can be approximately 30 Hz or more (e.g., 90 Hz). As an example, the first threshold can be set to be a frequency that is greater than or equal to an estimated refresh rate of the display 114. As described above, the estimated refresh rate of the display 114 can be associated with a frequency of the pulse-width modulation signal.

Additionally, the face-authentication system 202 can configure the camera system 212 to use an exposure time 308 that is less than a second threshold for detecting the pulse-width modulation pattern 400. The second threshold can be approximately equal to a reciprocal of an estimated frequency of the pulse-width modulation signal. The estimated frequency can be a frequency that has a high likelihood of being used based on the types of displays anticipated in the presentation attack 116. For example, the exposure time 308 can be less than approximately $1/360$ seconds or $1/240$ seconds. In general, the face-authentication system 202 can appropriately set the capture rate 306 and the exposure time 308 to enable a sufficient amount of light to be captured for detecting the pulse-width modulation pattern 400.

During operation, the camera system 212 captures at least one of the images 106-1 to 106-3 of the display 114, which are presented as part of the presentation attack 116. The images 106-1 to 106-3 each include the bright regions 402 and the dim regions 404. In some cases, the bright regions 402 and the dim regions 404 occur at different positions within the images 106-1 to 106-3. By analyzing one or more of the images 106-1 to 106-3, the spoofing detector 214 recognizes the pulse-width modulation pattern 400 and detects the presentation attack 116.

In an example, multiple ones of the images 106-1 to 106-3 are analyzed and changes between these images are identified, allowing the pulse-width modulation pattern 400 to be recognized, and the presentation attack 116 to be detected. That is, recognizing the pulse-width modulation pattern 400 may comprise recognizing the pattern within the multiple images by comparing different images and identifying changes between the images, and/or by identifying different parts of the pattern in one or more of the images 106-1 to 106-3.

Figure 5:
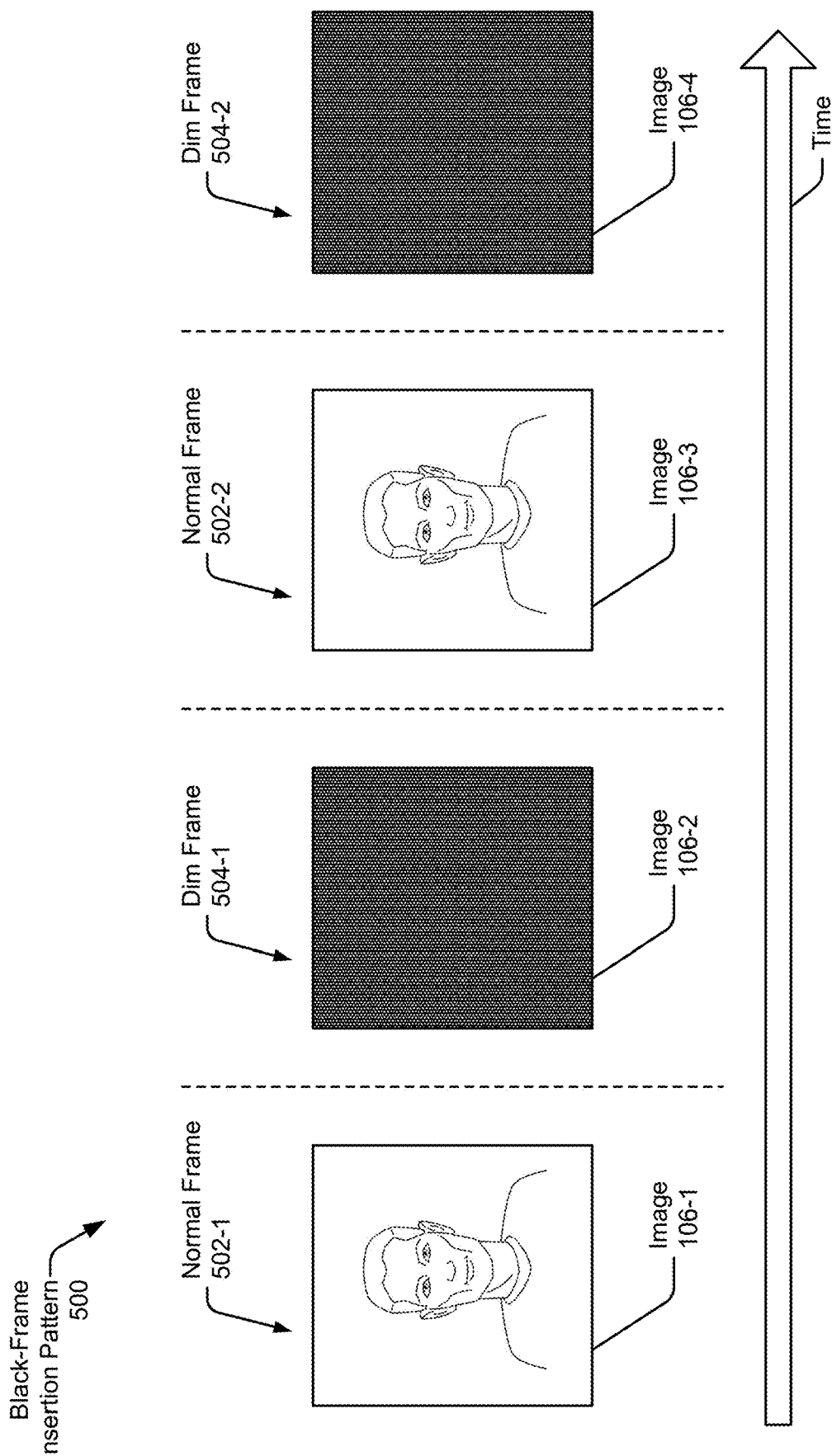
FIG. 5 illustrates an example black-frame-insertion pattern.

FIG. 5 illustrates an example black-frame-insertion pattern 500, which the spoofing detector 214 can recognize. Some displays 114, including LCDs, LED displays, and some OLED displays, use black-frame insertion (BFI) to reduce motion blur. This technique inserts dim frames (e.g., black frames or dark frames) between the refresh of the display 114 and the next frame. In general, the dim frames are less bright than the normal frames. The insertion of the dim frames effectively causes a human eye to observe a faster refresh rate, which adds additional smoothness and continuity to motion depicted on the display 114.

Use of black-frame insertion creates the black-frame-insertion pattern 500, which is characterized by normal frames (e.g., normal frames 502-1 and 502-2) interlaced with dim frames (e.g., dim frames 504-1 and 504-2). In general, the dim frames 504-1 and 504-2 are less bright than the normal frames 502-1 and 502-2.

To detect the black-frame-insertion pattern 500, the face-authentication system 202 configures the camera system 212 to use a capture rate 306 that is greater than a threshold for detecting the black-frame-insertion pattern 500. The threshold can be twice an estimated refresh rate of the display 114. Example refresh rates can be approximately 30 Hz or more (e.g., 45 Hz, 60 Hz, 90 Hz, or 120 Hz). The estimated refresh rate can be a refresh rate that has a high likelihood of being used based on the types of displays anticipated in the presentation attack 116.

During operation, the camera system 212 captures at least two of the images 106-1 to 106-4 of the display 114, which are presented as part of the presentation attack 116. The images 106-1 and 106-3 capture the normal frames 502-1 and 502-2, which are presented by the display 114. The images 106-2 and 106-4 capture the dim frames 504-1 and 504-2, which are presented by the display 114 due to black-frame insertion. By analyzing two or more of the images 106-1 to 106-4, the spoofing detector 214 recognizes the black-frame-insertion pattern 500 and detects the presentation attack 116.

Figure 6:
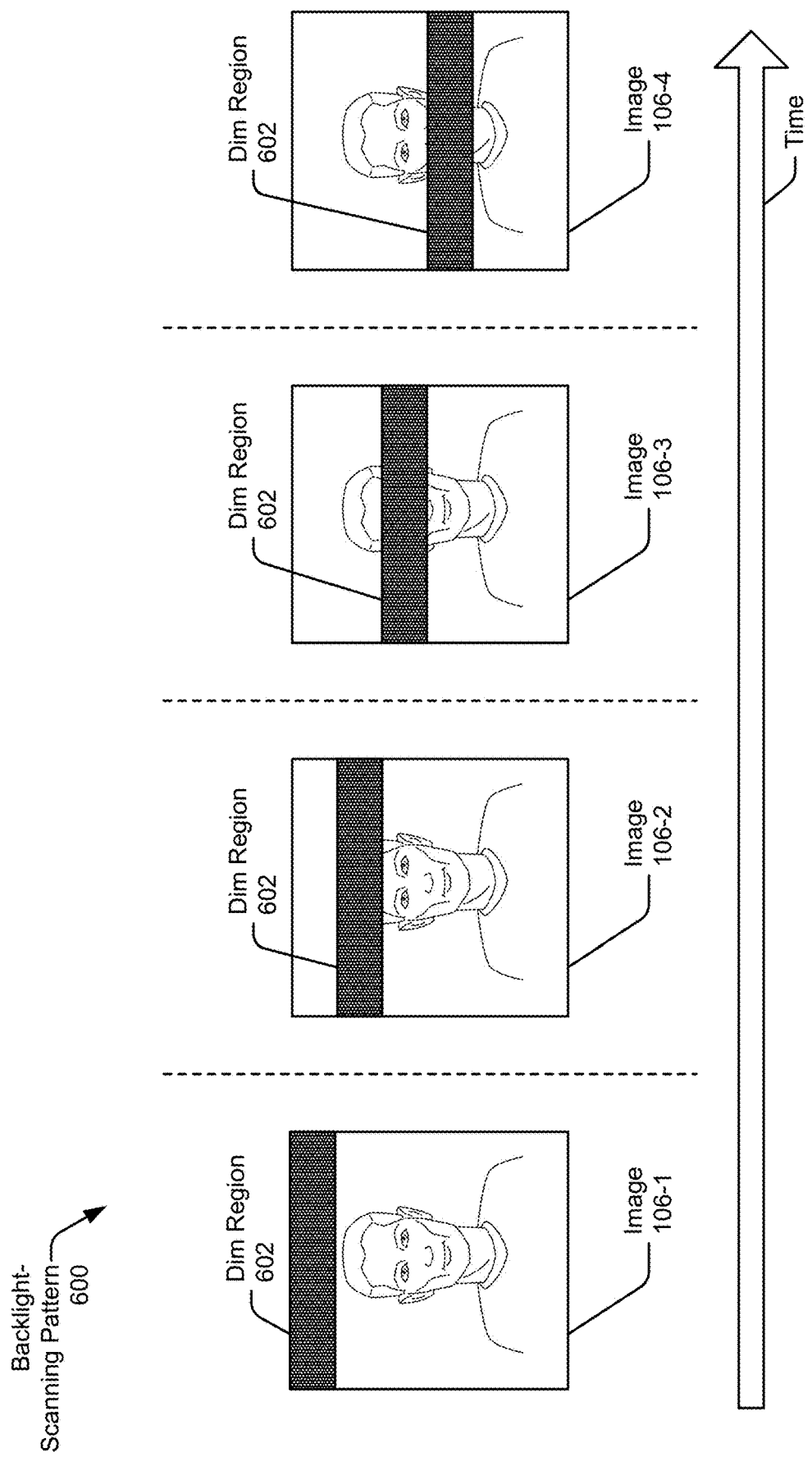
FIG. 6 illustrates an example backlight-scanning pattern.

FIG. 6 illustrates an example backlight-scanning pattern 600, which the spoofing detector 214 can recognize. Some displays 114, including some LCDs, use backlight scanning (backlight strobing or strobed backlighting) to reduce motion blur. This technique turns off a backlight to dim different regions of an image in sequence. In general, the dim region is less bright than the rest of the frame.

Use of backlight scanning creates the backlight-scanning pattern 600, which is characterized by each frame having a dim region 602. The dim region 602 can vary in position between the frames, as shown in FIG. 6.

To detect the backlight-scanning pattern 600, the face-authentication system 202 configures the camera system 212 to use a capture rate 306 that is greater than a threshold for detecting the backlight-scanning pattern 600. The threshold can be twice an estimated backlight-scanning rate of the display 114. The backlight-scanning rate can be approximately 30 Hz or more (e.g., 45 Hz, 60 Hz, 90 Hz, or 120 Hz). The estimated backlight-scanning rate can be a rate that has a high likelihood of being used based on the types of displays anticipated in the presentation attack 116.

During operation, the camera system 212 captures at least one of the images 106-1 to 106-4 of the display 114, which are presented as part of the presentation attack 116. The images 106-1 to 106-4 each include the dim region 602, which encompasses a portion of the images 106-1 to 106-4. When the images 106-1 to 106-4 are organized in sequence, the dim region 602 appears to move down across the images 106-1 to 106-4. For example, the dim region 602 is at the top of image 106-1 while the image 106-4 has the dim region 602 around a lower-middle position. By analyzing one or more of the images 106-1 to 106-4, the spoofing detector 214 recognizes the backlight-scanning pattern 600 and detects the presentation attack 116.

In an example, multiple ones of the images 106-1 to 106-4 are analyzed and changes between the images are identified, allowing the backlight-scanning pattern 600 to be recognized, and the presentation attack 116 to be detected. That is, recognizing the backlight-scanning pattern 600 may comprise recognizing the pattern within the multiple images by comparing different images and identifying changes, and/or by identifying different parts of the pattern in one or more of the images 106-1 to 106-4.

Example Method

FIG. 7 depicts an example method 700 for performing operations of pattern recognition for face-authentication anti-spoofing. Method 700 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100 of FIG. 1, and entities detailed in FIG. 2 or 3, reference to which is made for example only. The techniques are not limited to performance by one entity or multiple entities operating on one device.

At 702, a capture rate of a camera system of a face-authentication system is set to be greater than a threshold for detecting a pattern associated with an operation of a display. For example, the face-authentication system 202 sets the capture rate 306 of the camera system 212 to be greater than a threshold for detecting a pattern associated with an operation of the display 114. The pattern can be the pulse-width-modulation pattern 400 of FIG. 4, which is associated with a brightness of the display 114. Alternatively, the pattern can be the black-frame-insertion pattern 500 or the backlight-scanning pattern 600, which are associated with motion blur reduction.

At 704, at least one image of an object is captured using the capture rate. For example, the camera system 212 of the face-authentication system 202 captures one or more of the images 106-1 to 106-N using the capture rate 306, as shown in FIG. 3. The images 106-1 to 106-N depict an object. In some situations, the object is a display 114 that is used as part of a presentation attack 116, as shown in FIG. 1.

At 706, the pattern is recognized within the at least one image. For example, the spoofing detector 214 of the face-authentication system 202 recognizes the pattern within at least one of the images 106-1 to 106-N. In particular, the spoofing detector 214 can recognize the pattern as the pulse-width-modulation pattern 400 of FIG. 4 or the backlight-scanning pattern 600 of FIG. 6 within one or more of the images 106-1 to 106-N. Alternatively, the spoofing detector 214 can recognize the pattern as the black-frame-insertion pattern 500 of FIG. 5 based on changes across or between two or more of the images 106-1 to 106-N.

At 708, the object is determined to include the display responsive to the pattern being recognized. For example, the spoofing detector 214 determines that the object includes at least a portion of the display 114 responsive to recognizing the pattern. In this case, the spoofing detector 214 generates the pattern-recognition indicator 310 to indicate that the presentation attack 116 is detected, as shown in FIG. 3.

At 710, face authentication is prevented responsive to determining that the object includes the display. For example, the spoofing detector 214 prevents face authentication responsive to determining that the object includes the display 114. The spoofing detector 214 can prevent face authentication by causing the face recognizer 216 to not perform face recognition or by causing the face-authentication system 202 to generate the report 312, which indicates that face authentication failed.

In some implementations, the method 700 represents part of a full face-authentication process. For example, the face-authentication system 202 can also perform face recognition using the face recognizer 216 prior to authenticating the user 104. In some cases, steps 702 to 710 can occur prior to capturing other images for face recognition. For face recognition, the capture rate 306 (and other settings) of the camera system 212 can be set in a different manner than described at 702.

Example Computing System

Figure 8:
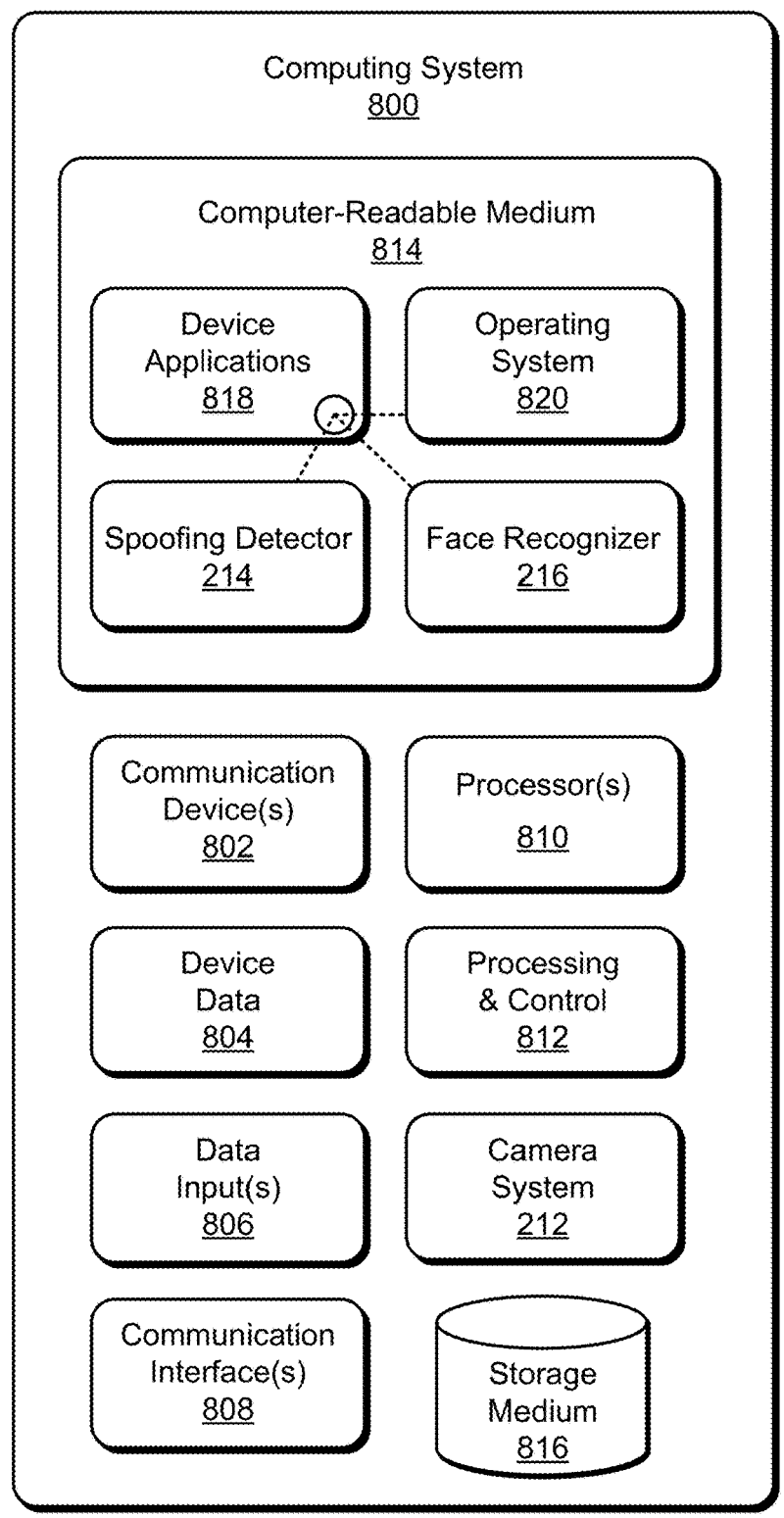
FIG. 8 illustrates an example computing system embodying, or in which techniques may be implemented that enable use of, a face-authentication system capable of performing pattern recognition for anti-spoofing.

FIG. 8 illustrates various components of an example computing system 800 that can be implemented as any type of client, server, and/or computing device as described with reference to the previous FIG. 2 to implement a face-authentication system 202 that performs pattern recognition for face-authentication anti-spoofing.

The computing system 800 includes communication devices 802 that enable wired and/or wireless communication of device data 804 (e.g., received data, data that is being received, data scheduled for broadcast, or data packets of the data). The device data 804 or other device content can include configuration settings of the device, media content stored on the device, and/or information associated with a user 104 of the device. Media content stored on the computing system 800 can include any type of audio, video, and/or image data. The computing system 800 includes one or more data inputs 806 via which any type of data, media content, and/or inputs can be received, such as human utterances, user-selectable inputs (explicit or implicit), messages, music, television media content, recorded video content, and any other type of audio, video, and/or image data received from any content and/or data source.

The computing system 800 also includes communication interfaces 808, which can be implemented as any one or more of a serial and/or parallel interface, a wireless interface, any type of network interface, a modem, and as any other type of communication interface. The communication interfaces 808 provide a connection and/or communication links between the computing system 800 and a communication network by which other electronic, computing, and communication devices communicate data with the computing system 800.

The computing system 800 includes one or more processors 810 (e.g., any of microprocessors, controllers, and the like), which process various computer-executable instructions to control the operation of the computing system 800 and to enable techniques for, or in which can be embodied, gesture recognition in the presence of saturation. Alternatively or in addition, the computing system 800 can be implemented with any one or combination of hardware, firmware, or fixed logic circuitry that is implemented in connection with processing and control circuits which are generally identified at 812. Although not shown, the computing system 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 800 also includes a computer-readable media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 800 can also include a camera system 212 and a mass storage media device (storage media) 816.

The computer-readable media 814 provides data storage mechanisms to store the device data 804, as well as various device applications 818 and any other types of information and/or data related to operational aspects of the computing system 800. For example, an operating system 820 can be maintained as a computer application with the computer-readable media 814 and executed on the processors 810. The device applications 818 may include a device manager, such as any form of a control application, software application, signal-processing and control module, code that is native to a particular device, a hardware abstraction layer for a particular device, and so on.

The device applications 818 also include any system components, engines, or managers to implement pattern recognition for face-authentication anti-spoofing. In this example, the device applications 818 include the spoofing detector 214 and the face recognizer 216 of the face-authentication system 202 (of FIG. 2).

CONCLUSION

Although techniques using, and apparatuses including, pattern recognition for face-authentication anti-spoofing have been described in language specific to features and/or methods, it is to be understood that the subject of the appended claims is not necessarily limited to the specific features or methods described. Rather, the specific features and methods are disclosed as example implementations of pattern recognition for face-authentication anti-spoofing.

Some Examples are described below.

Example 1: A method performed by a face-authentication system, the method comprising:
  setting a capture rate of a camera system of the face-authentication system to be greater than a threshold for detecting a pattern associated with an operation of a display;
  capturing at least one image of an object using the capture rate;
  recognizing the pattern within the at least one image;
  responsive to recognizing the pattern, determining that the object includes the display; and
  responsive to determining that the object includes the display, preventing face authentication.

Example 2: The method of example 1, further comprising:
  capturing at least one second image of a second object using the capture rate;
  determining that the pattern is not present within the at least one second image;
  recognizing the second object as a face of a user; and
  responsive to determining that the pattern is not present and recognizing the second object, authenticating the user.

Example 3: The method of example 1 or 2, wherein the pattern comprises bright regions interlaced with dim regions within the at least one image.

Example 4: The method of example 3, wherein the pattern comprises a pulse-width-modulation pattern associated with a brightness of the display.

Example 5: The method of example 3 or 4, wherein the threshold for detecting the pulse-width-modulation pattern is approximately 30 hertz.

Example 6: The method of any preceding example, further comprising controlling an exposure time of the camera system to be less than a second threshold for detecting the pattern.

Example 7: The method of example 6, wherein the second threshold is approximately equal to a reciprocal of an estimated frequency of a pulse-width-modulation signal associated with the display.

Example 8: The method of example 1 or 2, wherein the pattern comprises a dim region within the at least one image.

Example 9: The method of example 8, wherein:
  the at least one image comprises multiple images; and
  the dim region encompasses a total area of each image within a subset of the multiple images.

Example 10: The method of example 9, wherein the pattern comprises a black-frame-insertion pattern associated with motion blur reduction.

Example 11: The method of example 10, wherein the threshold for detecting the black-frame-insertion pattern is greater than twice a refresh rate of the display.

Example 12: The method of example 8, wherein the dim region encompasses a portion of the at least one image.

Example 13: The method of example 12, wherein the pattern comprises a backlight-scanning pattern associated with motion blur reduction.

Example 14: The method of example 13, wherein the threshold for detecting the backlight-scanning pattern is greater than twice a backlight-scanning rate of the display.

Example 15: The method of any preceding example, wherein:
the at least one image comprises multiple images; and
the recognizing the pattern within the at least one image comprises recognizing the pattern within the multiple images.

Example 16: The method of example 15, wherein the recognizing the pattern within the multiple images comprises identifying changes between ones of the multiple images.

Example 17: The method of any preceding example, wherein the display comprises:
a light-emitting-diode display;
a liquid-crystal display; or
another liquid-crystal display with backlight scanning.

Example 18: An apparatus comprising the face-authentication system configured to perform any one of the methods of examples 1-17.

Example 19: A computer-readable storage medium comprising instructions that, responsive to execution by a processor, cause the face-authentication system to perform any one of the methods of examples 1-17.

The invention claimed is:

1. A method performed by a face-authentication system, the method comprising:
setting a capture rate of a camera system of the face-authentication system to be greater than a threshold for detecting a pattern associated with an operation of a display;
capturing at least one image of an object using the capture rate;
recognizing the pattern within the at least one image;
responsive to recognizing the pattern, determining that the object includes the display; and
responsive to determining that the object includes the display, preventing face authentication.

2. The method of claim 1, further comprising:
capturing at least one second image of a second object using the capture rate;
determining that the pattern is not present within the at least one second image;
recognizing the second object as a face of a user; and
responsive to determining that the pattern is not present and recognizing the second object, authenticating the user.

3. The method of claim 1, wherein the pattern comprises bright regions interlaced with dim regions within the at least one image.

4. The method of claim 3, wherein the pattern comprises a pulse-width-modulation pattern associated with a brightness of the display.

5. The method of claim 3, wherein the threshold for detecting the pulse-width-modulation pattern is approximately 30 hertz.

6. The method of claim 1, further comprising controlling an exposure time of the camera system to be less than a second threshold for detecting the pattern.

7. The method of claim 6, wherein the second threshold is approximately equal to a reciprocal of an estimated frequency of a pulse-width-modulation signal associated with the display.

8. The method of claim 1, wherein the pattern comprises a dim region within the at least one image.

9. The method of claim 8, wherein:
the at least one image comprises multiple images; and
the dim region encompasses a total area of each image within a subset of the multiple images.

10. The method of claim 9, wherein the pattern comprises a black-frame-insertion pattern associated with motion blur reduction.

11. The method of claim 10, wherein the threshold for detecting the black-frame-insertion pattern is greater than twice a refresh rate of the display.

12. The method of claim 8, wherein the dim region encompasses a portion of the at least one image.

13. The method of claim 12, wherein the pattern comprises a backlight-scanning pattern associated with motion blur reduction.

14. The method of claim 13, wherein the threshold for detecting the backlight-scanning pattern is greater than twice a backlight-scanning rate of the display.

15. The method of claim 1, wherein:
the at least one image comprises multiple images; and
the recognizing the pattern within the at least one image comprises recognizing the pattern within the multiple images.

16. The method of claim 15, wherein the recognizing the pattern within the multiple images comprises identifying changes between ones of the multiple images.

17. The method of claim 1, wherein the display comprises:
a light-emitting-diode display;
a liquid-crystal display; or
another liquid-crystal display with backlight scanning.

18. An apparatus comprising a face-authentication system configured to: set a capture rate of a camera system of the face-authentication system to be greater than a threshold for detecting a pattern associated with an operation of a display;
capture at least one image of an object using the capture rate;
recognize the pattern within the at least one image;
responsive to recognizing the pattern, determine that the object includes the display; and
responsive to determining that the object includes the display, prevent face authentication.

19. The apparatus of claim 18, wherein the pattern comprises:
a pulse-width-modulation pattern associated with a brightness of the display;
a black-frame-insertion pattern associated with motion blur reduction; or
a backlight-scanning pattern associated with motion blur reduction.

20. A non-transitory computer-readable storage medium comprising instructions that, responsive to execution by a processor, cause a face-authentication system to:
set a capture rate of a camera system of the face-authentication system to be greater than a threshold for detecting a pattern associated with an operation of a display;
capture at least one image of an object using the capture rate;
recognize the pattern within the at least one image;
responsive to recognizing the pattern, determine that the object includes the display; and
responsive to determining that the object includes the display, prevent face authentication.

* * * * *